United States Patent
Livne et al.

(10) Patent No.: US 12,079,428 B1
(45) Date of Patent: Sep. 3, 2024

(54) FREQUENCY-BASED NOISE REMOVAL

(71) Applicant: Microsoft Technology Licensing, LLC, Redmond, WA (US)

(72) Inventors: Yael Livne, Tel Aviv (IL); Shai Levi, Or-Yehuda (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/186,501

(22) Filed: Mar. 20, 2023

(51) Int. Cl.
  *G06F 3/041* (2006.01)
  *G06F 3/0354* (2013.01)

(52) U.S. Cl.
  CPC ...... *G06F 3/04182* (2019.05); *G06F 3/03545* (2013.01); *G06F 2203/04106* (2013.01)

(58) Field of Classification Search
  CPC ............ G06F 3/04182; G06F 3/03545; G06F 2203/04106
  See application file for complete search history.

(56) References Cited

U.S. PATENT DOCUMENTS

| | | | |
|---|---|---|---|
| 11,068,106 B2 * | 7/2021 | Liang | G06F 3/0412 |
| 2011/0157069 A1 * | 6/2011 | Zhuang | G06F 3/0445 |
| | | | 345/174 |
| 2013/0271434 A1 | 10/2013 | King-Smith et al. | |
| 2014/0184554 A1 * | 7/2014 | Walley | G06F 3/0441 |
| | | | 345/174 |
| 2016/0004357 A1 | 1/2016 | Westhues et al. | |
| 2019/0042054 A1 * | 2/2019 | Moseley | G06F 3/04182 |
| 2019/0317637 A1 | 10/2019 | Jiang | |
| 2020/0183526 A1 | 6/2020 | Gray | |
| 2021/0096723 A1 | 4/2021 | Morin et al. | |

FOREIGN PATENT DOCUMENTS

WO 2022087917 A1 5/2022

OTHER PUBLICATIONS

International Search Report and Written Opinion received for PCT Application No. PCT/US2024/019295, Jul. 1, 2024, 15 pages.

\* cited by examiner

*Primary Examiner* — Chineyere D Wills-Burns
*Assistant Examiner* — Cory A Almeida
(74) *Attorney, Agent, or Firm* — Holzer Patel Drennan

(57) ABSTRACT

An electronic device samples radiofrequency signals measured by multiple antennas positioned across the digitizer, wherein the radiofrequency signals include noise components. The electronic device selects an orthogonal frequency outside the defined bandwidth of the working frequency and removes at least some of the noise components from the radiofrequency signals measured by each antenna based at least on a sense signal measured at the orthogonal frequency by the each antenna.

20 Claims, 5 Drawing Sheets

FREQUENCY-BASED NOISE REMOVAL

BACKGROUND

Many modern computing devices support touch input and electronic stylus interaction via a sensor panel in a display of the computing device. The sensor panel includes a matrix of antennas capable of detecting transmitted signals from an active stylus and/or changes in capacitance at or near the surface of the display, such as those caused by the approach, retreat, or the presence of a conductive body (e.g., a finger, a stylus). The positions of the antennas in the matrix detecting these signals/capacitance changes translates to a position of the conductive body on or near the display. As such, the sensor panel allows the computing device to track touch and stylus positions across the display.

SUMMARY

In some aspects, the techniques described herein relate to a method of managing radiofrequency noise in a digitizer to detect an active stylus signal having a working frequency within a defined bandwidth, the method including: sampling radiofrequency signals measured by multiple antennas positioned across the digitizer, wherein the radiofrequency signals include noise components; selecting an orthogonal frequency outside the defined bandwidth of the working frequency; and removing at least some of the noise components from the radiofrequency signals measured by each antenna based at least on a sense signal measured at the orthogonal frequency by the each antenna.

In some aspects, the techniques described herein relate to a system for managing radiofrequency noise in a digitizer to detect an active stylus signal having a working frequency within a defined bandwidth, the system including: one or more hardware processors; a signal sampler executable by the one or more hardware processors and configured to sample radiofrequency signals measured by multiple antennas positioned across the digitizer, wherein the radiofrequency signals include noise components; a frequency selector executable by the one or more hardware processors and configured to select an orthogonal frequency outside the defined bandwidth of the working frequency, wherein the orthogonal frequency differs from the working frequency by at least an inverse of a correlator window duration; and a noise cleaner executable by the one or more hardware processors and configured to remove at least some of the noise components from the radiofrequency signals measured by each antenna based at least on a sense signal measured at the orthogonal frequency by the each antenna.

In some aspects, the techniques described herein relate to one or more tangible processor-readable storage media embodied with instructions for executing on one or more processors and circuits of a computing device a process of managing radiofrequency noise in a digitizer to detect an active stylus signal having a working frequency within a defined bandwidth, the process including: sampling radiofrequency signals measured by multiple antennas positioned across the digitizer, wherein the radiofrequency signals include noise components; selecting an orthogonal frequency outside the defined bandwidth of the working frequency; and removing at least some of the noise components from the radiofrequency signals measured by each antenna based at least on a sense signal measured at the orthogonal frequency by the each antenna and a sense signal measured at the orthogonal frequency by a reference antenna.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

The described technology is directed to removing at least some noise from signals received by antennas in a matrix of a sensor panel (sometimes referred to as a digitizer) in order to provide accurate tracking across a display of an electronic device. Sources of noise can include without limitation radiofrequency (RF) emissions from the display itself and other radiofrequency signals from the environment. For example, a nearby RF emission source, such as a poorly shielded high-fidelity speaker system, can produce an RF noise signal that can be sensed by antennas in the matrix and interpreted as a stylus attempting to render digital ink on the display. If the noise signal strength detected by the sensor panel is sufficient (e.g., exceeding a predetermined threshold) to detect the presence and X-Y position of the electronic stylus tip with respect to the display. In some cases, the noise can reduce the strength of the stylus signal and introduce errors in sensing by the sensor panel. Even when there is no true touch or inking event, the background noise experienced by the antennas of the sensor panel can introduce incorrect inking (e.g., "ghosting inking"), negative impacts on power consumption (e.g., trying to sync on a stylus that is not present), latency in detecting true events, etc.

Existing noise removal techniques are based on assumptions about the characteristics of the sensor panel (e.g., assuming a relatively consistent noise response from one side of the sensor panel to the other) and typically rely on the position or index a reference antenna (e.g., an antenna in the sensor panel that is not sensing touch) along a sensor matrix row or column. However, such assumptions are incorrect in some implementations of touch screens in electronic devices. For example, some devices experience a stronger noise response near the center of a display than near the edges of the display, which causes the selection of one antenna versus another antenna as a reference antenna to dramatically impact the accuracy of the noise removal. It should be understood that noise removal need not be perfect or complete. Instead, noise removal may remove some or all of the noise components from a sense signal, particularly based on this frequency-based approach, to provide the technical benefit of more accurate active stylus signal detection, thereby minimizing or reducing false inking and other undesirable artifacts.

Accordingly, the described technology incorporates frequency-based elements to perform noise removal when possible. In particular, the described technology improves the cleaning of background noise, independent of the presence of a stylus or other conductive body, to reduce the likelihood of false positives resulting from the background noise.

Figure 1:
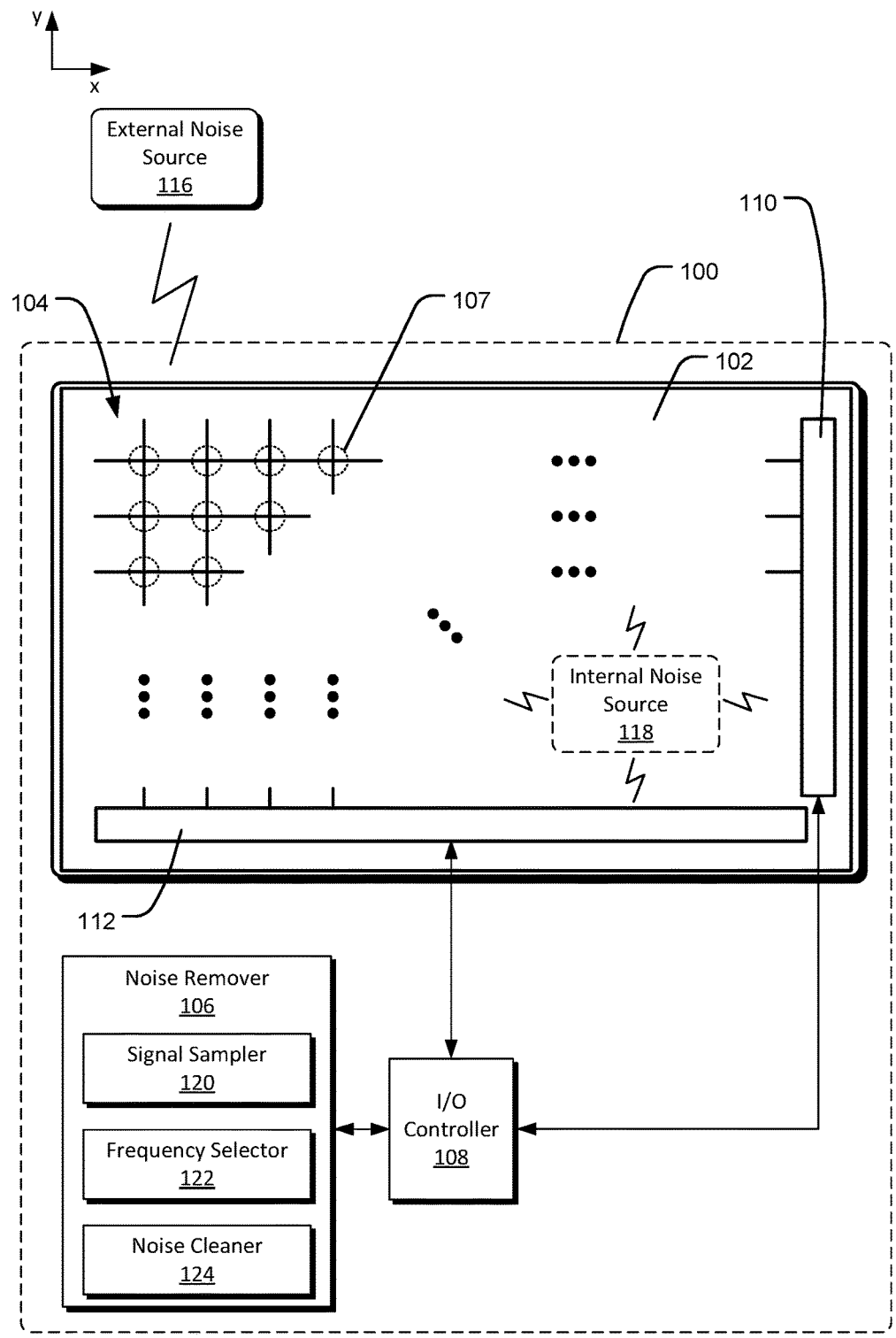
FIG. 1 illustrates an example electronic device including a touch screen and a noise remover.

FIG. 1 illustrates an example electronic device 100 including a touch screen 102 and a noise remover 106. The electronic device 100 may be in the form of a mobile phone, tablet computer, touchpad, portable computer, desktop computer, touchscreen display, etc. The touch screen 102 includes a digitizer 104 having a matrix of antennas laid out along an x-axis and a y-axis. The electronic device 100 also includes one or more input/output controllers (e.g., I/O controller 108) and other components. The I/O controller 108 may include a combination of random access memory (RAM), sense channels, channel scan logic, a charge pump, and driver logic, which manages the sensing of touch and/or stylus input through the digitizer. The I/O controller 108 is coupled to the matrix of antennas to receive touch and/or stylus input during the use of the touch screen 102. In various implementations, the touch screen 102 may also include a matrix of light-emitting elements (e.g., pixels) to provide display functionality.

The antennas in the touch screen 102 are laid out along the x-axis with indices 0 to X and along the y-axis with indices 0 to Y. The antennas in each direction extend across the touch screen 102 along their respective axes, overlapping at intersections referred to as "touch nodes" (see, e.g., touch node 107), although other configurations of antennas may also form touch nodes (e.g., adjacent antennas, rather than overlapping antennas). In one implementation, the x-axis antennas are referred to as "sense lines," and the y-axis antennas are referred to as "drive lines," although other implementations may be employed. Active stylus signals and/or changes in capacitance can be detected and measured by the I/O controller 108 to determine the x-y positions of one or more conductive objects as they touch or move in proximity to the antennas in the touch screen 102. The I/O controller 108 is electrically connected to the drive lines via a drive interface 110 and to the sense lines via a sense interface 112.

In some implementations, the drive lines are supplied with an AC waveform, and changes in capacitance of a corresponding touch node may be measured. As a conductive object approaches a touch node, the capacitance of the touch node can change (e.g., decrease in the case of a mutual capacitance touch screen, increase in the case of a self-capacitance touch screen) based on capacitive coupling with the approaching conductive object (e.g., a finger). Likewise, as a conductive object retreats from the touch node, the capacitance of the touch node changes to indicate the retreat.

In some implementations, the digitizer of the touch screen 102 can sense an electronic stylus, which can generate an active stylus signal. An example active stylus signal is centered substantially at a 25 kHz radiofrequency signal, wherein 25 kHz is referred to as the "working frequency" or "WF" of the electronic stylus signal. In some implementations, the digitizer 104 is synchronized with the display signals to open a window in time (e.g., a scan window or correlator window duration), where the sensing lines "listen" for the active stylus signal in order to determine the position of the electronic stylus tip. By correlating the rows and columns of the antennas in the digitizer 104 that are detecting the active stylus signals, the position of the electronic stylus tip along the x-axis and the y-axis of the touch screen 102 can be determined by the I/O controller 108. For example, the value of the antennas within the scan window is sampled and converted to DFTs (discrete Fourier transforms). The active stylus signal is detected if the value of a DFT measured by the digitizer 104 by one or more specific antennas exceeds a pen detection threshold. After the presence of the electronic stylus signal is detected, the I/O controller 108 tracks the active stylus signal across the digitizer 104. Furthermore, in some implementations, the touch screen 102 can also discern between an active stylus signal and a finger or palm touch against the touch screen 102 (e.g., for palm rejection). Accordingly, in some implementations, the touch screen 102 can be configured to detect both passive conductive objects (e.g., a finger, passive styluses) and active styluses.

The various detection features of the touch screen 102 can be negatively impacted by electromagnetic noise, which can be categorized in this description to include external noise sources (e.g., an external noise source 116) and internal noise sources (e.g., an internal noise source 118). An example external noise source 116 may include nearby audio speakers, external displays, etc. An example internal noise source 118 may include electronic system components, such as processors, memory, power supplies, etc. and other antennas and circuitry within the touch screen 102. Such noise can be detected incorrectly as an active stylus signal and result in incorrect inking (e.g., "ghosting inking"), negative impacts on power consumption (e.g., trying to sync on a stylus that is not present), latency in detecting true events, etc. For example, in some scenarios, such noise can result in digital ink being rendered on a touch screen display when no active stylus is present.

Accordingly, the noise remover 106 interacts with the I/O controller 108 to clean noise from the sense signals processed by the I/O controller 108. In some implementations, referred to as "common noise removal" or "CNR," the noise remover 106 can clean noise from the sense signals by subtracting the value of a signal sensed by a single reference antenna. For example, assume that the antennas (Ant(i)) are positioned along the x-axis at indexed from i=0 to 30. The noise remover 106 may select the antenna Ant(10) as the reference antenna. As such, using the equation below, the noise remover 106 can clean noise from a signal sensed by Ant(i) by subtracting the signal sensed by reference antenna Ant(10): is $$\text{Ant}(i)_{WF\_cleaned} = \text{Ant}(i)_{WF} - \text{Ant}(10)_{WF}$$

Noise removal works best when the distribution of noise across the x-axis (or across the distribution of antennas on the x-axis) is substantially uniform. In some scenarios, the distribution of noise across the distribution of antennas is not uniform (e.g., more noise is present in the center of the distribution than at the ends), reflecting that some antennas sense more noise than others. In this scenario, the selection of a reference antenna can dramatically impact noise removal. For example, if reference antenna Ant(10) senses more noise than Ant(i), the resulting "cleaned" signal value can be artificially reduced, even to the point of being negative, thereby incorrectly reducing the value of an active stylus signal sensed by Ant(i) to the point of not satisfying the pen detection threshold. Likewise, if reference antenna Ant(10) senses less noise than Ant(i), the resulting "cleaned" signal value can be artificially elevated, even to the point of still satisfying the pen detection threshold when an active stylus is not present. As such, cleaning noise from a digitizer's sense signals using a single reference antenna can still result in incorrect active stylus signal detection, resulting in incorrect inking (e.g., "ghosting inking"), negative impacts on power consumption (e.g., trying to sync on a stylus that is not present), latency in detecting true events, etc.

The noise remover 106 can, therefore, use two or more reference antennas for noise-cleaning using "background noise removal" or "BNR." The sense signal values from the multiple reference antennas are measured, and slopes of sense signal values along the x-axis (the index axis) between reference antennas are computed. However, while BNR works locally in regions of substantially monotonic increasing or decreasing values along the x-axis, there are scenarios exhibiting local spikes or other nonconforming sense signal values in which BNR can also fail to accurately clean the noise from the sense signals, resulting in incorrect inking (e.g., "ghosting inking"), negative impacts on power consumption (e.g., trying to sync on a stylus that is not present), latency in detecting true events, etc. Furthermore, there are scenarios in which there is no available second reference antenna within the region of interest, which precludes the use of BNR to remove at least some of the noise components. Accordingly, the described technology provides a technical benefit of accurately cleaning noise in many scenarios when BNR is not an available option.

In the described technology, rather than simply relying on a sense signal value measured from a reference antenna along the x-axis, the noise remover 106 evaluates the frequencies of sense signals. In the described technology, an antenna in the digitizer that is not sensing a touch input is selected as the reference antenna. A signal sampler 120 of the noise remover 106 samples sample radiofrequency signals measured by multiple antennas positioned across the digitizer, wherein the radiofrequency signals include noise components. By sampling signals from multiple antennas, the system provides a technical benefit of detecting the proximity of objects, including an active stylus, across the surface of the display—the more antennas distributed across the matrix of the digitizer, the more precisely the object locations can be detected.

A frequency selector 122 of the noise remover 106 evaluates the sense signals at one or more selected frequencies that are near the active stylus signal (e.g., which, in this example, is centered at 25 kHz). Each selected frequency is referred to as an orthogonal frequency (e.g., orthogonal to the frequency of the active stylus signal) because the selected frequency will not contain the active stylus signal, so it can be assumed that any signal at the selected frequency is from noise. For example, it can be assumed that an active stylus signal is substantially visible only within a narrow bandwidth centered at 25 kHz and not at an orthogonal frequency. As such, an orthogonal frequency is considered similar or near to the working frequency (WF) but does not contain substantial components of the active stylus signal (e.g., the bandwidth of the active stylus signal does not include the orthogonal frequency).

In various implementations, an orthogonal frequency may be selected by the frequency selector 122 based on the time duration or period of the correlator ($T_{correlator}$), such as using the equation below:

$$f_{orthogonal} = WF \pm \frac{1}{T_{correlator}} \quad (1)$$

In other implementations, other nearby frequencies can be selected as the orthogonal frequencies, including frequencies known to have signal values near zero, which can be determined independently of the time duration of the correlator. The orthogonal frequencies are sometimes referred to herein as "noise bin frequencies." Accordingly, in this context, orthogonality means that the frequency spacing is substantially $\Delta f = k/T$, k Hertz, where T correlator duration (e.g., scanning window size), and k is a positive integer, typically equal to 1. Orthogonal frequencies are expected to exhibit little or no crosstalk between sense signals at the frequencies.

The sense signals at the orthogonal frequencies are evaluated according to a clean ratio condition. In one implementation, a valid orthogonal frequency, for the purposes of the described technology, has a ratio of $$\frac{Ant(Ref)_{WF}}{Ant(Ref)_{NB}}$$

within a range of predesignated upper and lower bounds (described in more detail below). Other clean ratio conditions may be employed.

If a valid orthogonal frequency is selected by the frequency selector 122, a noise cleaner 124 subtracts a prorated portion of the sense signal value measured by an antenna at the orthogonal frequency from the sense signal value measured by the antenna at the working frequency to yield the cleaned sense signal value measured by the antenna at the working frequency. In one implementation, as described below, the proration is based on a ratio of a sense signal value measured by a reference antenna at the working frequency to a sense signal value measured by the reference antenna at the orthogonal frequency. In some implementation, the sense signals measured by the reference antenna includes a combination of sense signals measured by multiple reference antennas, such as an average of the sense signal values from all reference antennas. In this manner, the noise cleaner 124 provides a technical benefit of cleaning noise from sense signals by removing at least some of the noise components based at least in part on noise detected at frequencies known not to be influenced by and/or coupled with an active stylus signal, providing a more accurate level of noise removal.

In summary, the noise remover 106 can use various methods to remove at least some of the noise from sense signals in the digitizer 104, including CNR, BNR, and frequency-based noise removal. It should be understood that the described technology may be applied across one or both axes (e.g., the x-axis and the y-axis) of the digitizer, particularly for detection of active stylus signals—as such, noise cleaning can be performed along both axes. Furthermore, in some implementation, sense lines may be distributed on one or both axes of the digitizer.

Figure 2:
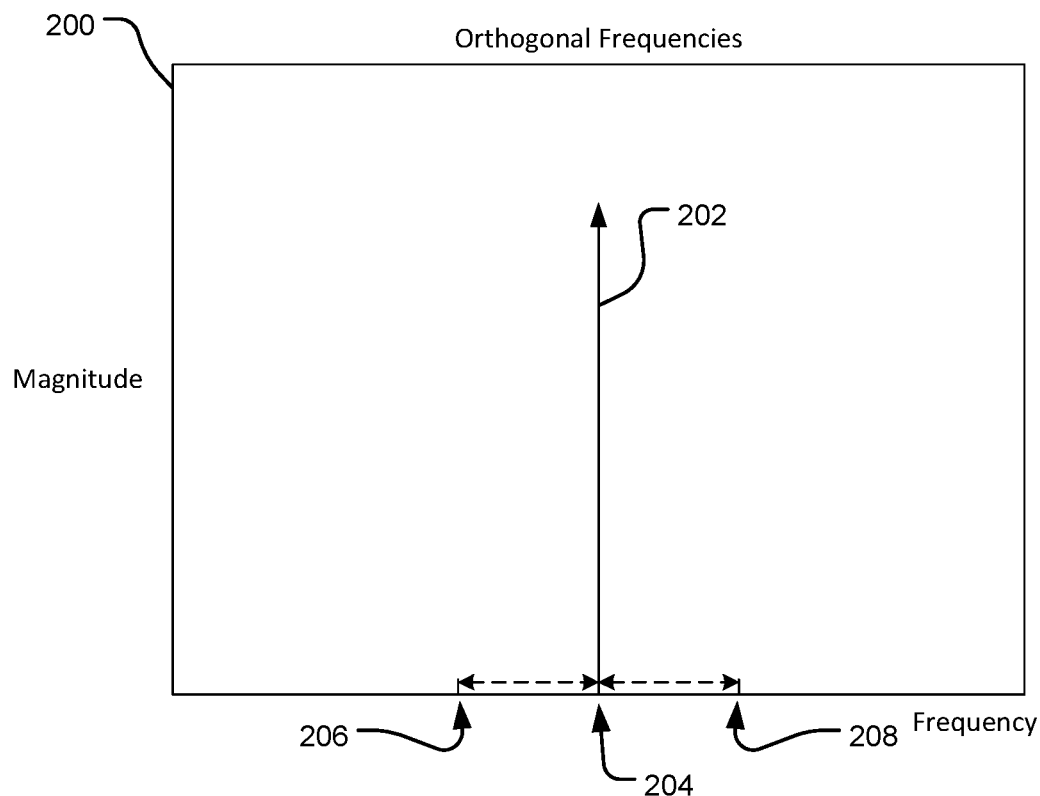
FIG. 2 illustrates example orthogonal frequencies in relation to a working frequency.
Figure 2:
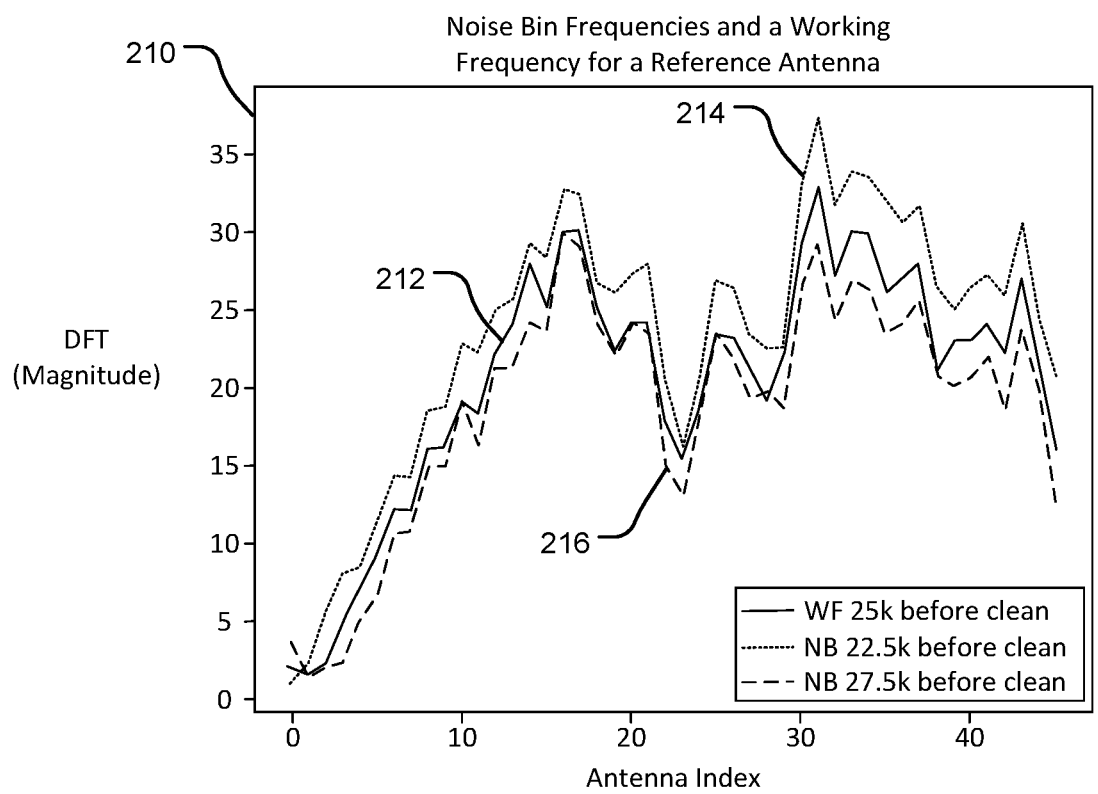

FIG. 2 illustrates example orthogonal frequencies in relation to a working frequency. The term "frequency bin" generally denotes a segment $[f_1, f_h]$ that contains information in a frequency axis and is defined between a low frequency bound $f_1$ and a high frequency bound $f_h$. Noise bins refer to frequency bins for DFTs that contain or are expected to contain noise instead of signal components. As used herein, the term "noise bin frequency" refers to an orthogonal frequency within a noise bin.

A diagram 200 in FIG. 2 illustrates a concept of orthogonal frequencies relative to an active stylus signal 202. The x-axis of the diagram 200 indicates frequency and the y-axis of the diagram 200 indicates magnitude. Accordingly, if the frequency 204 is the working frequency of the active stylus signal 202 and is characterized by a substantial magnitude to indicate the presence of the active stylus signal 202, the frequencies 206 and 208 are orthogonal frequencies (noise bin frequencies) that are characterized by little or no signal magnitude from the active stylus signal 202.

In one implementation, the orthogonal frequencies are selected as shown in Equation (1) above, such that the differences between the working frequency and the orthogonal frequencies are based on the time duration of the correlator used to detect the active stylus signal 202

$$\left(\text{e.g., } \pm \frac{1}{T_{correlator}}\right).$$

Based on a $T_{correlator}$=400 μs and a working frequency of 25 kHz, for example, orthogonal frequencies of 22.5 kHz and 27.5 kHz are selected. In other implementations, the orthogonal frequencies can be selected by other means (e.g., selecting frequencies known not to contain substantial components of the active stylus signal 202).

A diagram 210 illustrates DFT magnitude values of sense signals of each antenna (indexed along the x-axis) before noise removal. A solid line 212 indicates the sense signal component at the working frequency of 25 kHz for each antenna before cleaning. A dotted line 214 indicates the sense signal component at the noise bin frequency of 22.5 kHz for each antenna before cleaning. A dashed line 216 indicates the sense signal component at the noise bin frequency of 27.5 kHz for each antenna before cleaning. In the described technology, one or more of the noise bin frequencies, as shown in FIG. 2, are used for frequency-based noise removal from sense signals in a digitizer.

Figure 3:
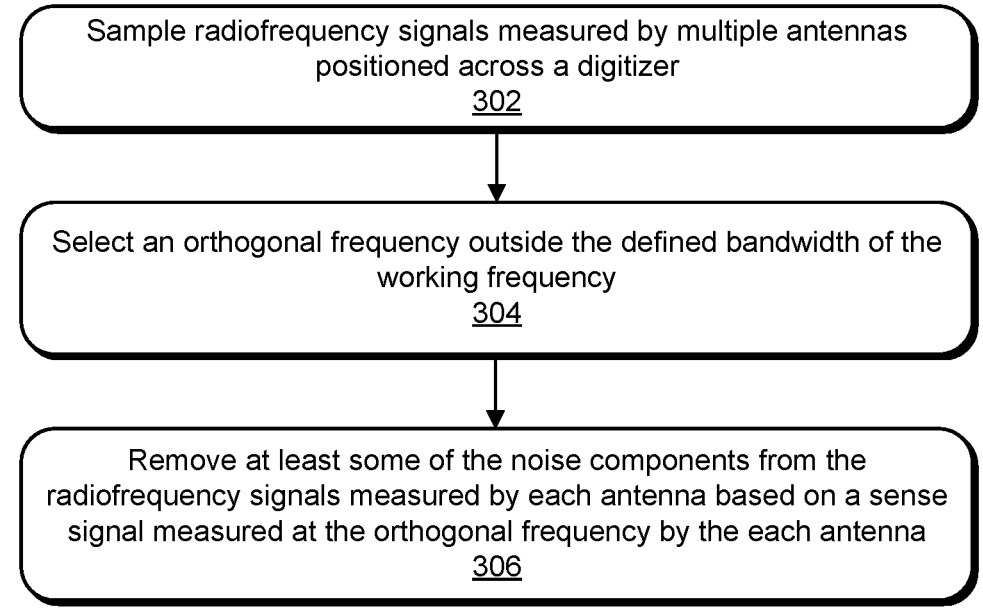
FIG. 3 illustrates example operations for frequency-based noise removal.

FIG. 3 illustrates example operations 300 for frequency-based noise removal. The operations 300 manage radiofrequency noise in a digitizer to detect an active stylus signal having a working frequency within a defined bandwidth. A sampling operation 302 samples radiofrequency signals measured by multiple antennas positioned across the digitizer. The radiofrequency signals include noise components of the radiofrequency noise.

A selection operation 304 selects an orthogonal frequency outside the defined bandwidth of the working frequency. In one implementation, the selection operation 304 includes selecting the orthogonal frequency used to remove at least some of the noise components based on a ratio of a sense signal measured at the working frequency by a reference antenna to a sense signal measured at the orthogonal frequency by the reference antenna. In some implementations, the orthogonal frequency differs from the working frequency by at least an inverse of a correlator window duration.

In other implementations, the selection operation 304 includes determining, for each frequency of multiple frequencies, a ratio of a sense signal measured at the working frequency by a reference antenna to a sense signal measured at each frequency by the reference antenna and selecting a frequency of the multiple frequencies having to a ratio closest to one as the orthogonal frequency to use in the noise removal because it is considered to be a truer representation of a signal without contributions from the active stylus signal, touch input signals, or other noise components that appear in one orthogonal frequency but not the other. In some implementations, the selection operation 304 includes determining, for each frequency of multiple frequencies, a ratio of a sense signal measured at the working frequency by a reference antenna to a sense signal measured at the each frequency by the reference antenna and invalidating each frequency having a ratio that does not satisfy a clean ratio condition from being selected as the orthogonal frequency.

As previously described, a reference antenna allows a noise remover to determine a reference level of noise that is expected not to include an active noise signal. Likewise, two reference antennas allow a determination of a slope of the sense signal magnitude between the two spatially separated antennas in the digitizer, which allows the noise cleaner to interpolate and/or extrapolate a reference level of noise that is expected at different positions across the digitizer. The two-antenna approach works particularly well when the noise distribution across the digitizer is not very uniform or consistent.

Nevertheless, the described technology goes a step further by correlating noise components based on signal components at frequencies outside of the working frequency bandwidth, thereby removing at least some noise components from a sense signal based at least in part on a prorated sense signal frequency component outside the working frequency. Accordingly, the Ant(i)$_{WF}$ component of the sense signal is reduced by a Ant (i) NB component (which is expected to be primarily noise) that is adjusted by a ratio of the corresponding components at a reference antenna. In this manner, the system provides a technical benefit of more accurately removing at least some of the expected noise components from the Ant(i)$_{WF}$ component when the ratio of the corresponding components sensed by a reference antenna is deemed valid.

In some scenarios, the use of the prorated sense signal value measured by the antenna (Ant(i)) at the orthogonal frequency to remove at least some of the noise components from each antenna leads to less than satisfactory results. Accordingly, in some implementations, the ratio to be used in the proration is tested to determine whether it is valid (e.g., expected to provide satisfactory results. For validity testing of potential orthogonal frequencies, the ratio is evaluated against a clean ratio condition, such as a range from a low ratio bound to a high ratio bound (e.g., a low ratio bound equals 0.693889 and a high ratio bound equals 1.44). If the ratio of Ant (Ref)$_{WF}$ to Ant(Ref)$_{NB}$ is not within the range from the low ratio bound to the high ratio bound, the ratio does not satisfy the clean ratio condition and the frequency is invalidated as an orthogonal frequency. If the ratio of Ant(Ref)$_{WF}$ to Ant(Ref)$_{NB}$ is within the range from the low ratio bound to the high ratio bound, the ratio satisfies the clean ratio condition and the frequency is validated as a potential orthogonal frequency to be used in removing at least some of the noise components. If all of the potential orthogonal frequencies are invalidated, then cleaning can proceed with either BNR or CNR, although in some scenarios, BNR would be executed before the described technology.

Furthermore, if more than one frequency satisfies the clean ratio condition to be deemed a valid orthogonal frequency, one of the frequencies can be chosen as the orthogonal frequency to be used in removing at least some of the noise components. For example, in one implementation, the valid orthogonal frequency having a ratio closest to one as compared to another valid orthogonal frequency may be selected for use in removing at least some of the noise components.

In other implementations, the sense signal value measured by a reference antenna at the working frequency and a sense signal value measured by a reference antenna at the orthogonal frequency may include a combination of measurements from multiple reference antennas, such as an average of sense signal values from four different reference antennas.

In some implementations, a SQUARE_SUMMED_VALUE_RATIO parameter refers to a method used to enhance the electronic stylus signal by summarizing the DFT values of adjacent antennas such that the signal is summed and increased (e.g., this approach is useful when the electronic stylus is positioned right between two adjacent antennas)—the working frequencies sense signals are summed while the noise bin frequency sense signals are not. As such, this difference in the relative contributions of signals at these frequencies is considered when calculating the ratio of a sense signal value measured by a reference antenna at the working frequency to a sense signal value measured by the reference antenna at the orthogonal frequency, (e.g., by multiplying the denominator by SQUARE_SUMMED_VALUE_RATIO parameter). For example: if five adjacent antennas are summed, it can be assumed that the SQUARE_SUMMED_VALUE_RATIO parameter value equals 5 when there is no active stylus signal present).

A cleaning operation 306 removes at least some of the noise components from the radiofrequency signals measured by each antenna based on a sense signal measured at the orthogonal frequency by the each antenna. In some implementations, the cleaning operation 306 includes removing at least some of the noise components from the radiofrequency signals measured by each antenna based on the sense signal measured at the orthogonal frequency by the each antenna and a sense signal measured at the orthogonal frequency by a reference antenna. In other implementations, the cleaning operation 306 includes removing at least some of the noise components from the radiofrequency signals for each antenna based on the sense signal measured as the orthogonal frequency by each antenna, a sense signal measured at the orthogonal frequency at a reference antenna, and a sense signal measured at the working frequency at the reference antenna. In yet other implementations, the cleaning operation 306 includes removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

For example, in one implementation, the cleaning operation 306 removes at least some of the noise by subtracting from the sense signal value measured by an antenna (Ant(i)) at the working frequency a prorated sense signal value measured by the antenna (Ant(i)) at the orthogonal frequency. In one implementation, the proration is based on a ratio of a sense signal value measured by a reference antenna at the working frequency to a sense signal value measured by a reference antenna at the orthogonal frequency, as shown below:

$$Ant(i)_{WF\_cleaned} = Ant(i)_{WF} - Ant(i)_{NB} \cdot \frac{Ant(Ref)_{WF}}{Ant(Ref)_{NB}} \quad (2)$$

where:

Ant(i)$_{WF\_cleaned}$=the DFT value of the sense signal measured by the antenna Ant(i) at the working frequency after cleaning Ant(i)$_{WF}$=the DFT value of the sense signal measured by the antenna Ant(i) at the working frequency before cleaning Ant(i)$_{NB}$=the DFT value of the sense signal measured by the antenna Ant(i) at the orthogonal frequency before cleaning Ant(Ref)$_{WF}$=the DFT value of the sense signal measured by the reference antenna Ant(Ref) at the working frequency before cleaning Ant(Ref)$_{NB}$=the DFT value of the sense signal measured by the reference antenna Ant(Ref) at the orthogonal frequency before cleaning In one implementation, complex division is used to obtain the subtrahend to be subtracted from the pre-cleaned sense signal value by Ant(i) at the working frequency, as shown below:

Given $$Ant(i)_{WF\_cleaned} = Ant(i)_{WF} - Ant(i)_{NB} \cdot \frac{Ant(Ref)_{WF}}{Ant(Ref)_{NB}},$$

the components of the subtrahend $$Ant(i)_{NB} \cdot \frac{Ant(Ref)_{WF}}{Ant(Ref)_{NB}}$$

are given in complex terms as:

Ant(i)$_{NB}$=Re$_1$+Im$_1$·j

Ant(Ref)$_{NB}$=Re$_2$+Im$_2$·j

Ant(Ref)$_{WF}$=Re$_3$+Im$_3$·j

Accordingly, the following can be used to implement the complex division:

$$\frac{a+b \cdot i}{d+c \cdot i} = \frac{ac+bd}{c^2+d^2} + i\frac{bc-ad}{c^2+d^2}$$

Therefore, the ratio for Equation (2) is given by:

$$\frac{Ant(Ref)_{WF}}{Ant(Ref)_{NB}} = \frac{Re_3 \cdot Re_2 + Im_3 \cdot Im_2}{Re_2^2 + Im_2^2} + i\frac{Im_3 \cdot Im_2 - Re_3 \cdot Re_2}{Re_2^2 + Im_2^2}$$

Similarly, the following can be used to implement the complex multiplication:

(a+bi)(c+di)=ac−bd+i(ad+bc)

Figure 4:
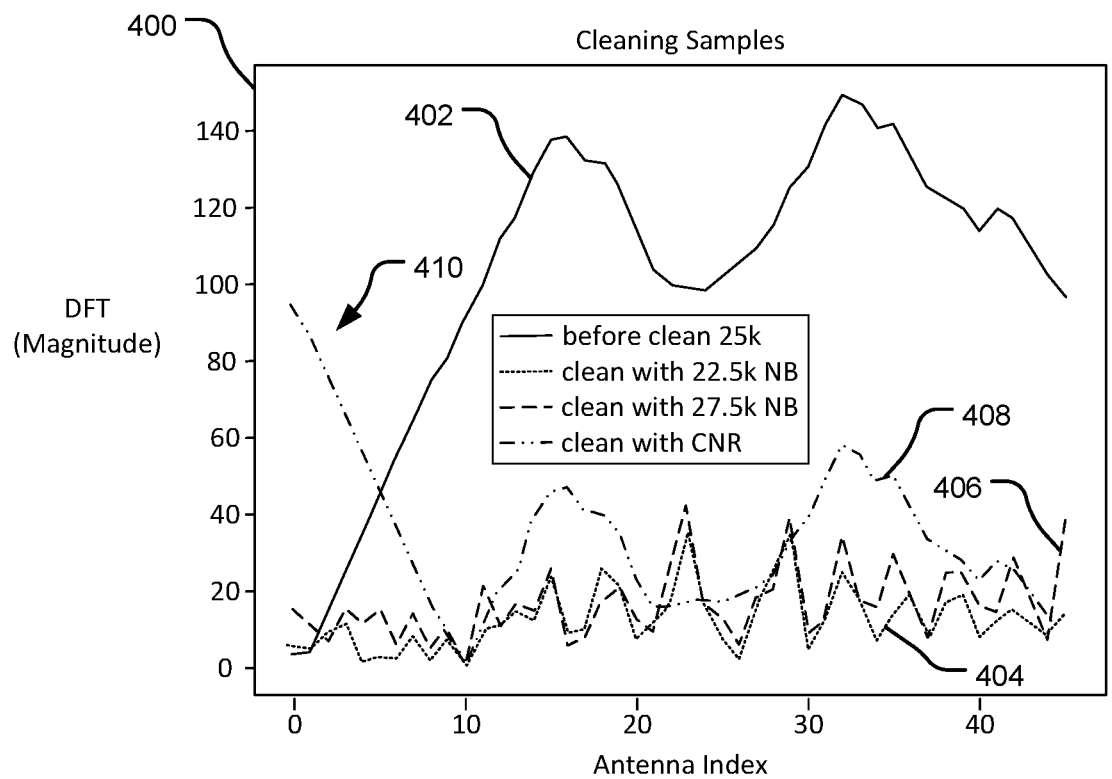
FIG. 4 illustrates example cleaning results using different noise removal techniques.

FIG. 4 illustrates example cleaning results using different noise removal techniques. A diagram 400 illustrates DFT magnitude values of sense signals of each antenna (indexed along the x-axis). A solid line 402 indicates a sense signal component at the working frequency of 25 kHz before noise removal. A dotted line 404 indicates the sense signal component at the working frequency of 25 kHz for each antenna after cleaning using the noise bin frequency of 22.5 kHz. A dotted line 406 indicates the sense signal component at the working frequency of 25 kHz for each antenna after cleaning using the noise bin frequency of 27.5 kHz.

The dashed-dotted line 408 indicates the sense signal component at the working frequency of 25 kHz for each antenna after cleaning only CNR. As an example of how the CNR cleaning can yield erroneous results, a region 410 of the CNR plot (dashed-dotted line 408) exhibits a steep downward slope from a high magnitude to a low magnitude, which would likely be interpreted by an I/O controller as an active stylus signal approaching from a side of the touch screen. In contrast, the sense signals cleaned by the orthogonal frequencies do not represent this incorrect artifact. In summary, in the described technology, one or more of the noise bin frequencies are used for frequency-based noise removal from sense signals in a digitizer.

Figure 5:
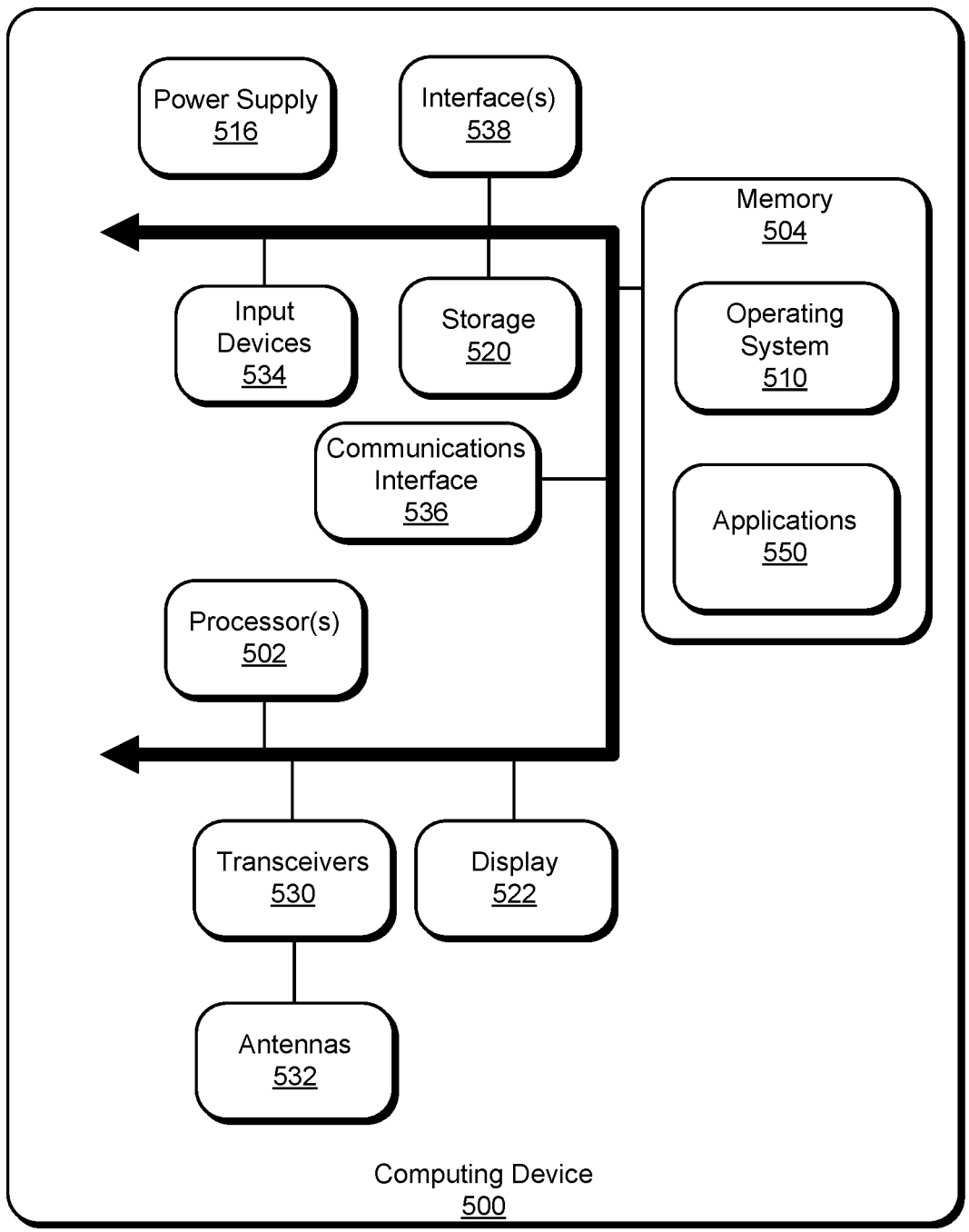
FIG. 5 illustrates an example computing device for use in implementing the described technology.

FIG. 5 illustrates an example computing device 500 for use in implementing the described technology. The computing device 500 may be a client computing device (such as a laptop computer, a desktop computer, or a tablet computer), a server/cloud computing device, an Internet-of-Things (IoT), any other type of computing device, or a combination of these options. The computing device 500 includes one or more processor(s) 502 and a memory 504. The memory 504 generally includes both volatile memory (e.g., RAM) and nonvolatile memory (e.g., flash memory), although one or the other type of memory may be omitted. An operating system 510 resides in the memory 504 and is executed by the processor(s) 502. In some implementations, the computing device 500 includes and/or is communicatively coupled to storage 520.

In the example computing device 500, as shown in FIG. 5, one or more modules or segments, such as applications 550, a noise remover, a signal sampler, a frequency selector, a noise cleaner, an I/O controller, and other program code and modules are loaded into the operating system 510 on the memory 504 and/or the storage 520 and executed by the processor(s) 502. The storage 520 may store sampled sense signals, DFT values, ratio values, one or more noise clean conditions (including potentially upper and lower ratio bounds), a SQUARE_SUMMED_VALUE_RATIO, and other data and be local to the computing device 500 or may be remote and communicatively connected to the computing device 500. In particular, in one implementation, components of a system for managing radiofrequency noise in a digitizer to detect an active stylus signal having a working frequency within a defined bandwidth may be implemented entirely in hardware or in a combination of hardware circuitry and software.

The computing device 500 includes a power supply 516, which may include or be connected to one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers, client devices, IoT devices, and other computing and communications devices. The computing device 500 may further include a communications interface 536 (such as a network adapter or an I/O port, which are types of communication devices). The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard, trackpad, or mouse). These and other input devices may be coupled to the server by one or more interfaces 538, such as a serial port interface, parallel port, or universal serial bus (USB). The computing device 500 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of managing radiofrequency noise in a digitizer to detect an active stylus signal having a working frequency within a defined bandwidth, the method comprising: sampling radiofrequency signals measured by multiple antennas positioned across the digitizer, wherein the radiofrequency signals include noise components; selecting an orthogonal frequency outside the defined bandwidth of the working frequency; and removing at least some of the noise components from the radiofrequency signals measured by each antenna based at least on a sense signal measured at the orthogonal frequency by the each antenna.

Clause 2. The method of clause 1, wherein the removing comprises: removing at least some of the noise components from the radiofrequency signals measured by each antenna based at least on the sense signal measured at the orthogonal frequency by the each antenna and a sense signal measured at the orthogonal frequency by a reference antenna.

Clause 3. The method of clause 1, wherein the removing comprises: removing at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

Clause 4. The method of clause 1, wherein the removing comprises: removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

Clause 5. The method of clause 1, wherein the selecting comprises: selecting the orthogonal frequency used to remove at least some of the noise components based at least on a ratio of a sense signal measured at the working frequency by a reference antenna to a sense signal measured at the orthogonal frequency by the reference antenna.

Clause 6. The method of clause 1, wherein the selecting comprises: determining, for each frequency of multiple frequencies, a ratio of a sense signal measured at the working frequency by a reference antenna to a sense signal measured at the each frequency by the reference antenna; and selecting a frequency of the multiple frequencies having to a ratio closest to one as the orthogonal frequency.

Clause 7. The method of clause 1, wherein the orthogonal frequency differs from the working frequency by at least an inverse of a correlator window duration.

Clause 8. The method of clause 1, wherein the selecting comprises: determining, for each frequency of multiple frequencies, a ratio of a sense signal measured at the working frequency by a reference antenna to a sense signal measured at the each frequency by the reference antenna; and invalidating each frequency having a ratio that does not satisfy a clean ratio condition from being selected as the orthogonal frequency.

Clause 9. A system for managing radiofrequency noise in a digitizer to detect an active stylus signal having a working frequency within a defined bandwidth, the system comprising: one or more hardware processors; a signal sampler executable by the one or more hardware processors and configured to sample radiofrequency signals measured by multiple antennas positioned across the digitizer, wherein the radiofrequency signals include noise components; a frequency selector executable by the one or more hardware processors and configured to select an orthogonal frequency outside the defined bandwidth of the working frequency, wherein the orthogonal frequency differs from the working frequency by at least an inverse of a correlator window duration; and a noise cleaner executable by the one or more hardware processors and configured to remove at least some of the noise components from the radiofrequency signals measured by each antenna based at least on a sense signal measured at the orthogonal frequency by the each antenna.

Clause 10. The system of clause 9, wherein the noise cleaner is further configured to remove at least some of the noise components from the radiofrequency signals measured by each antenna based at least on the sense signal measured at the orthogonal frequency by the each antenna and a sense signal measured at the orthogonal frequency by a reference antenna.

Clause 11. The system of clause 9, wherein the noise cleaner is further configured to remove at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

Clause 12. The system of clause 9, wherein the noise cleaner is further configured to remove at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

Clause 13. The system of clause 9, wherein the frequency selector is further configured to select the orthogonal frequency used to remove at least some of the noise components based at least on a ratio of a sense signal measured at the working frequency by a reference antenna to a sense signal measured at the orthogonal frequency by the reference antenna.

Clause 14. The system of clause 9, wherein the frequency selector is further configured to determine, for each frequency of multiple frequencies, a ratio of a sense signal measured at the working frequency by a reference antenna to a sense signal measured at the each frequency by the reference antenna and to select a frequency of the multiple frequencies having to a ratio closest to one as the orthogonal frequency.

Clause 15. One or more tangible processor-readable storage media embodied with instructions for executing on one or more processors and circuits of a computing device a process of managing radiofrequency noise in a digitizer to detect an active stylus signal having a working frequency within a defined bandwidth, the process comprising: sampling radiofrequency signals measured by multiple antennas positioned across the digitizer, wherein the radiofrequency signals include noise components; selecting an orthogonal frequency outside the defined bandwidth of the working frequency; and removing at least some of the noise components from the radiofrequency signals measured by each antenna based at least on a sense signal measured at the orthogonal frequency by the each antenna and a sense signal measured at the orthogonal frequency by a reference antenna.

Clause 16. The one or more tangible processor-readable storage media of clause 15, wherein the removing comprises: removing at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

Clause 17. The one or more tangible processor-readable storage media of clause 15, wherein the removing comprises: removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

Clause 18. The one or more tangible processor-readable storage media of clause 15, wherein the selecting comprises: selecting the orthogonal frequency used to remove at least some of the noise components based at least on a ratio of a sense signal measured at the working frequency by a reference antenna to a sense signal measured at the orthogonal frequency by the reference antenna.

Clause 19. The one or more tangible processor-readable storage media of clause 15, wherein the selecting comprises: determining, for each frequency of multiple frequencies, a ratio of a sense signal measured at the working frequency by a reference antenna to a sense signal measured at the each frequency by the reference antenna; and selecting a frequency of the multiple frequencies having to a ratio closest to one as the orthogonal frequency.

Clause 20. The one or more tangible processor-readable storage media of clause 15, wherein the orthogonal frequency differs from the working frequency by at least an inverse of a correlator window duration.

Clause 21. A system for managing radiofrequency noise in a digitizer to detect an active stylus signal having a working frequency within a defined bandwidth, the method comprising: means for sampling radiofrequency signals measured by multiple antennas positioned across the digitizer, wherein the radiofrequency signals include noise components; means for selecting an orthogonal frequency outside the defined bandwidth of the working frequency; and means for removing at least some of the noise components from the radiofrequency signals measured by each antenna based at least on a sense signal measured at the orthogonal frequency by the each antenna.

Clause 22. The system of clause 21, wherein the means for removing comprises: means for removing at least some of the noise components from the radiofrequency signals measured by each antenna based at least on the sense signal measured at the orthogonal frequency by the each antenna and a sense signal measured at the orthogonal frequency by a reference antenna.

Clause 23. The system of clause 21, wherein the means for removing comprises: means for removing at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

Clause 24. The system of clause 21, wherein the means for removing comprises: means for removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

Clause 25. The system of clause 21, wherein the means for selecting comprises: means for selecting the orthogonal frequency used to remove at least some of the noise components based at least on a ratio of a sense signal measured at the working frequency by a reference antenna to a sense signal measured at the orthogonal frequency by the reference antenna.

Clause 26. The system of clause 21, wherein the means for selecting comprises: means for determining, for each frequency of multiple frequencies, a ratio of a sense signal measured at the working frequency by a reference antenna to a sense signal measured at the each frequency by the reference antenna; and means for selecting a frequency of the multiple frequencies having to a ratio closest to one as the orthogonal frequency.

Clause 27. The system of clause 21, wherein the orthogonal frequency differs from the working frequency by at least an inverse of a correlator window duration.

Clause 28. The system of clause 21, wherein the means for selecting comprises: means for determining, for each frequency of multiple frequencies, a ratio of a sense signal measured at the working frequency by a reference antenna to a sense signal measured at the each frequency by the reference antenna; and means for invalidating each frequency having a ratio that does not satisfy a clean ratio condition from being selected as the orthogonal frequency.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized.

Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of managing radiofrequency noise in a digitizer to detect an active stylus signal having a working frequency within a defined bandwidth, the method comprising:
sampling radiofrequency signals measured by multiple antennas positioned across the digitizer, wherein the radiofrequency signals include noise components;
selecting an orthogonal frequency outside the defined bandwidth of the working frequency; and
cleaning the radiofrequency signals by removing at least some of the noise components from the radiofrequency signals measured by each antenna based at least on a sense signal measured at the orthogonal frequency by the each antenna.

2. The method of claim 1, wherein the removing comprises:
removing at least some of the noise components from the radiofrequency signals measured by each antenna based at least on the sense signal measured at the orthogonal frequency by the each antenna and a sense signal measured at the orthogonal frequency by a reference antenna, wherein the reference antenna is not sensing a touch input.

3. The method of claim 1, wherein the removing comprises:
removing at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

4. The method of claim 1, wherein the removing comprises:
removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

5. The method of claim 1, wherein the selecting comprises:
selecting the orthogonal frequency used to remove at least some of the noise components based at least on a ratio of a sense signal measured at the working frequency by a reference antenna to a sense signal measured at the orthogonal frequency by the reference antenna.

6. The method of claim 1, wherein the selecting comprises:
determining, for each frequency of multiple frequencies, a ratio of a sense signal measured at the working frequency by a reference antenna to a sense signal measured at the each frequency by the reference antenna; and
selecting a frequency of the multiple frequencies having to a ratio closest to one as the orthogonal frequency.

7. The method of claim 1, wherein the orthogonal frequency differs from the working frequency by at least an inverse of a correlator window duration.

8. The method of claim 1, wherein the selecting comprises:
determining, for each frequency of multiple frequencies, a ratio of a sense signal measured at the working frequency by a reference antenna to a sense signal measured at the each frequency by the reference antenna; and
invalidating each frequency having a ratio that does not satisfy a clean ratio condition from being selected as the orthogonal frequency.

9. A system for managing radiofrequency noise in a digitizer to detect an active stylus signal having a working frequency within a defined bandwidth, the system comprising:
one or more hardware processors;
a signal sampler executable by the one or more hardware processors and configured to sample radiofrequency signals measured by multiple antennas positioned across the digitizer, wherein the radiofrequency signals include noise components;
a frequency selector executable by the one or more hardware processors and configured to select an orthogonal frequency outside the defined bandwidth of the working frequency, wherein the orthogonal frequency differs from the working frequency by at least an inverse of a correlator window duration; and
a noise cleaner executable by the one or more hardware processors and configured to clean the radiofrequency signals by removing at least some of the noise components from the radiofrequency signals measured by each antenna based at least on a sense signal measured at the orthogonal frequency by the each antenna.

10. The system of claim 9, wherein the noise cleaner is further configured to remove at least some of the noise components from the radiofrequency signals measured by each antenna based at least on the sense signal measured at the orthogonal frequency by the each antenna and a sense signal measured at the orthogonal frequency by a reference antenna.

11. The system of claim 9, wherein the noise cleaner is further configured to remove at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna, wherein the reference antenna is not sensing a touch input.

12. The system of claim 9, wherein the noise cleaner is further configured to remove at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

13. The system of claim 9, wherein the frequency selector is further configured to select the orthogonal frequency used to remove at least some of the noise components based at least on a ratio of a sense signal measured at the working frequency by a reference antenna to a sense signal measured at the orthogonal frequency by the reference antenna.

14. The system of claim 9, wherein the frequency selector is further configured to determine, for each frequency of multiple frequencies, a ratio of a sense signal measured at the working frequency by a reference antenna to a sense signal measured at the each frequency by the reference antenna and to select a frequency of the multiple frequencies having to a ratio closest to one as the orthogonal frequency.

15. One or more tangible processor-readable storage media embodied with instructions for executing on one or more processors and circuits of a computing device a process of managing radiofrequency noise in a digitizer to detect an active stylus signal having a working frequency within a defined bandwidth, the process comprising:
    sampling radiofrequency signals measured by multiple antennas positioned across the digitizer, wherein the radiofrequency signals include noise components;
    selecting an orthogonal frequency outside the defined bandwidth of the working frequency; and
    cleaning the radiofrequency signals by removing at least some of the noise components from the radiofrequency signals measured by each antenna based at least on a sense signal measured at the orthogonal frequency by the each antenna and a sense signal measured at the orthogonal frequency by a reference antenna.

16. The one or more tangible processor-readable storage media of claim 15, wherein the removing comprises:
    removing at least some of the noise components from the radiofrequency signals for each antenna based at least on the sense signal measured as the orthogonal frequency by the each antenna, a sense signal measured at the orthogonal frequency at a reference antenna, and a sense signal measured at the working frequency at the reference antenna.

17. The one or more tangible processor-readable storage media of claim 15, wherein the removing comprises:
    removing at least some of the noise components from radiofrequency signals measured at the working frequency by each antenna of the multiple antennas by subtracting a prorated magnitude of a sense signal measured at the orthogonal frequency by the each antenna, wherein the prorated magnitude is proportional to a ratio of a sense signal measured at the working frequency by a reference antenna to a sense signal measured at the orthogonal frequency by the reference antenna.

18. The one or more tangible processor-readable storage media of claim 15, wherein the selecting comprises:
    selecting the orthogonal frequency used to remove at least some of the noise components based at least on a ratio of a sense signal measured at the working frequency by a reference antenna to a sense signal measured at the orthogonal frequency by the reference antenna, wherein the reference antenna is not sensing a touch input.

19. The one or more tangible processor-readable storage media of claim 15, wherein the selecting comprises:
    determining, for each frequency of multiple frequencies, a ratio of a sense signal measured at the working frequency by a reference antenna to a sense signal measured at the each frequency by the reference antenna; and
    selecting a frequency of the multiple frequencies having to a ratio closest to one as the orthogonal frequency.

20. The one or more tangible processor-readable storage media of claim 15, wherein the orthogonal frequency differs from the working frequency by at least an inverse of a correlator window duration.

* * * * *